INVENTORS
HENRY J. SCHULTZ
MELVERN ORTON
BY
ATTORNEY

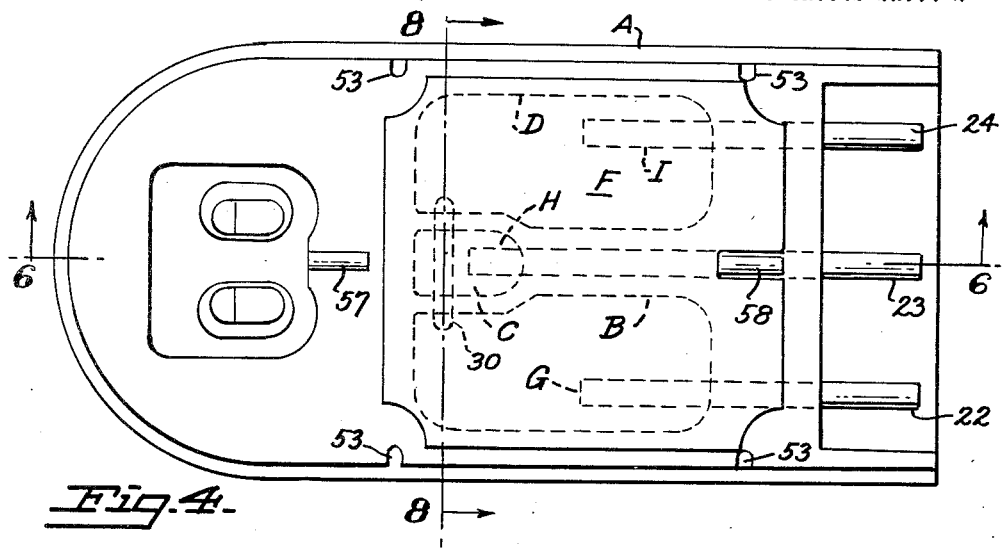
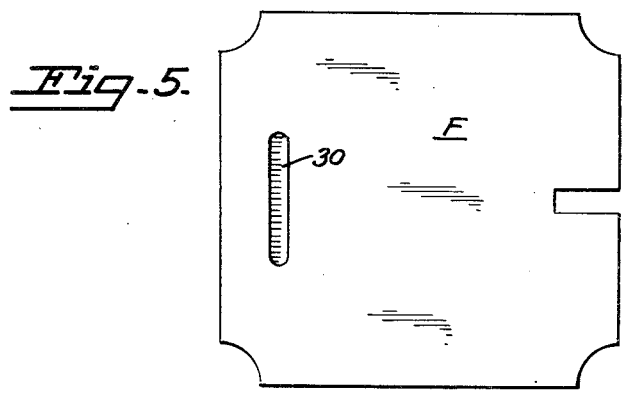
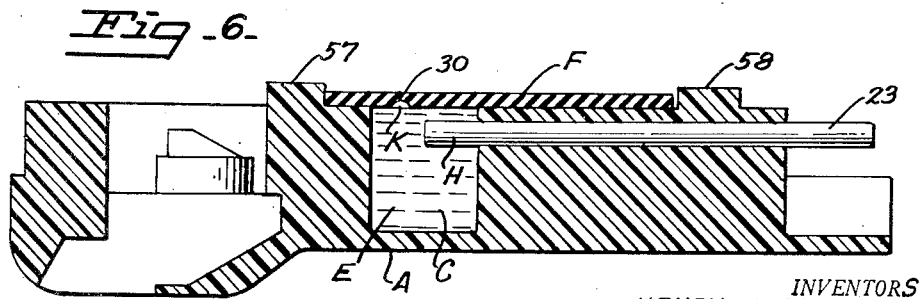

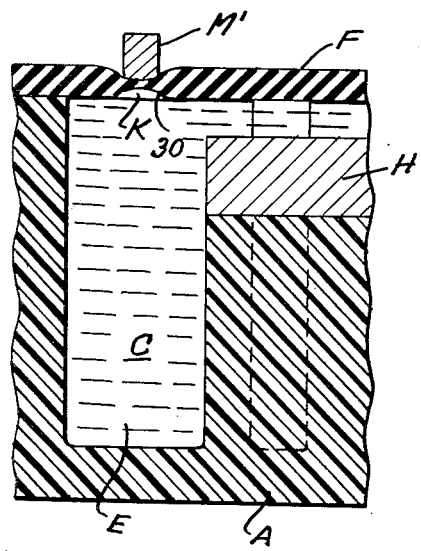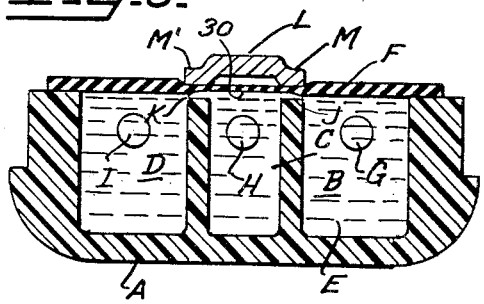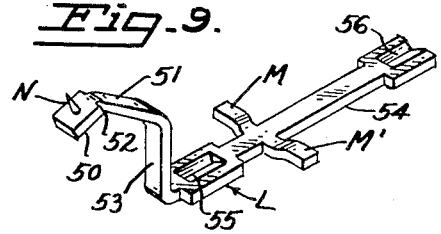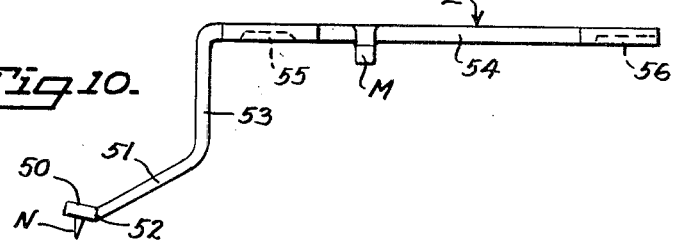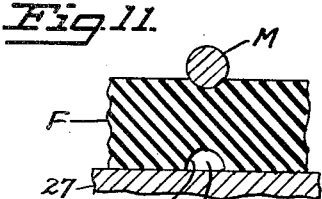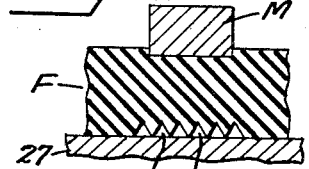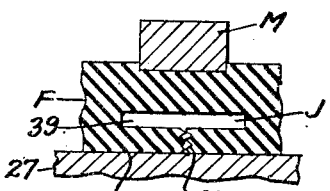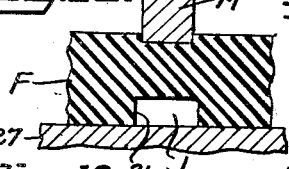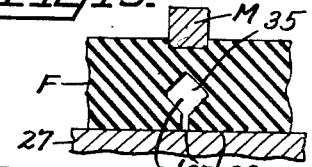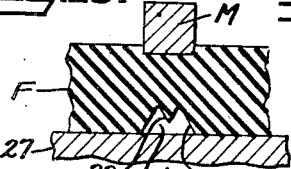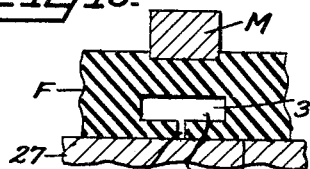

United States Patent Office 2,711,447
Patented June 21, 1955

2,711,447

PHONOGRAPH PICKUPS AND SIMILAR ELECTRIC CONTROL DEVICES

Henry J. Schultz, Hayward, and Melvern Orton, Alameda, Calif.

Application November 18, 1952, Serial No. 321,242

6 Claims. (Cl. 179—100.41)

This invention relates to an improved phonograph pickup and other electric control devices, of the type employing a fluid current-modulating medium.

In the type of pickup to which this invention relates, the phonograph needle is mounted on an actuator member which is swung in a small arc as the needle moves back and forth laterally in the record groove. The swinging of the actuator is used to modulate an electric current that flows between two or more electrodes through an electrolytic fluid contained in cavities or cells in a body member made of insulating material.

A preferred pickup construction divides the body member into three serially adjoining cavities—each containing an electrode and liquid. The central cavity is joined to the other cavities by a pair of orifices whose areas are varied by the actuator member in response to the movement of the needle. An orifice is formed between a wall of the chambers and a flexible diaphragm which yields to pressure exerted by the movement of the actuator member and tends to resume its shape when the pressure is relaxed by movement of the actuator member in the opposite direction. Each time the orifice changes in size, the electrical resistance between adjacent chambers changes, varying the current flow and voltage between them. In a pickup having three chambers, a difference in electric potential can be set up across the electrodes in the end chambers, and a varying voltage can be obtained from the electrode in the central chamber. This variation, obtained by varying the areas of the orifices between the central chamber and the other two chambers, causes the voltage on the electrode in the central chamber to increase and decrease relatively to the potential of the other two electrodes, although voltage between these two electrodes remains constant.

The present invention is an improvement in this type of construction and solves several problems which had not been solved heretofore.

This invention greatly reduces the manufacturing cost of the above explained type of phonograph pickup. Heretofore, some of the parts were very complicated in nature and had to be made in expensive dies. The body member had to be made from a type of plastic that could mold delicate small structures, and this type of plastic shrank while cooling.

A main feature of this invention is that the gap area is molded in the rubber diaphragm, on the face thereof. Heretofore the gap area was formed either by having a loose fit between the diaphragm and the body member or by providing a trough in the body member, the trough being an improvement over the structure in which loose fit was relied upon. In the present invention, the trough, gap, or orifice is molded directly in the diaphragm. For one thing, this saves dies and makes it possible to use other types of material for the body member instead of having to use material capable of being intricately formed with sharp edges and narrow parts that tend to break. With the present invention the body member could be made from glass, a fact which alone makes it possible to reduce the cost of the body member to a fraction of what it has been heretofore.

The time that this structure saves in assembly, the amount that it saves in the cost of dies, and the reduction of the number of skilled personnel necessary to make the parts, makes it easier to provide different sized gaps with the same body member and without having to change the dies for the body member. The diaphragm die is much simpler and less expensive than the body member die.

Other objects and advantages of the invention will appear from the following description of some preferred forms thereof given in accordance with United States revised statutes, section 4888 and in order that anyone skilled in the art may learn how to make the device. The details of structure given and the specification of particular materials are illustrative and are not intended to limit the claims narrowly.

In the drawings:

Fig. 4 is a top plan view of the body member with the armature removed but with the body member in place.

Fig. 5 is a bottom plan view of the diaphragm.

Fig. 6 is a view in section taken along the line 6—6 in Fig. 4.

Fig. 7 is a fragmentary view of a portion of Fig. 6.

Fig. 8 is a view in section taken along the line 8—8 of Fig. 4.

Fig. 9 is an isometric view of the actuator member, looking at it from below.

Fig. 10 is a view in side elevation of the actuator member.

Figs. 11 through 17 are diagrammatic fragmentary views showing various shaped gaps that may be used.

*General description of the pickup cartridge*

The pickup cartridge 20 includes a body member A with chambers B, C, and D filled with electrolytic liquid E and covered with a resilient diaphragm F. In each chamber B, C, and D is a respective electrode G, H, and I. When electrodes G and I are connected to a source of electric potential, an electric current flows between them by way of the variable area gaps or orifices J and K formed between the diaphragm F and the partitions between the chambers B, C, and D. The size of the orifices J and K at any moment is controlled by an armature L with presser feet or levers M and M'.

The outer end of the armature L holds the needle N. As the needle N is moved from side to side by a record groove, the armature L moves in a small arc normal to its longitudinal axis. This side-to-side movement moves the presser feet M and M' so that first the portion of the diaphragm above one orifice J is further depressed while the portion of the diaphragm above the other orifice K is opened somewhat, and then the opposite action occurs. When the orifice J is made smaller the electrical resistance between the electrodes G and H is increased; at the same time the widening of the orifice K decreases the resistance between the electrodes H and I. These changes vary the voltage on the electrode H which is used as the output voltage of the pickup 20. When the orifice J is opened and the orifice K is made smaller, the reverse situation exists between the electrodes. Thereby the shape of the record groove, which conforms to the original sound that was recorded, is faithfully transmitted by the pickup cartridge to the phonograph amplifier system and to the loud speaker.

Figure 1:
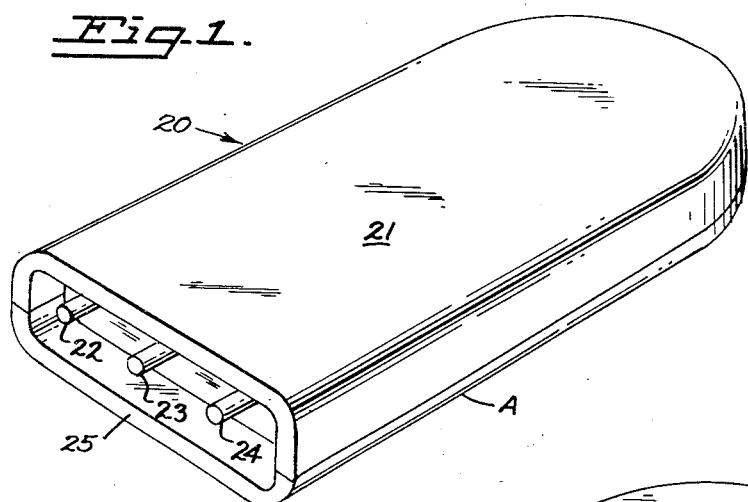
Fig. 1 is an isometric view of an assembled pickup cartridge incorporating the principles of the present invention.
Figure 2:
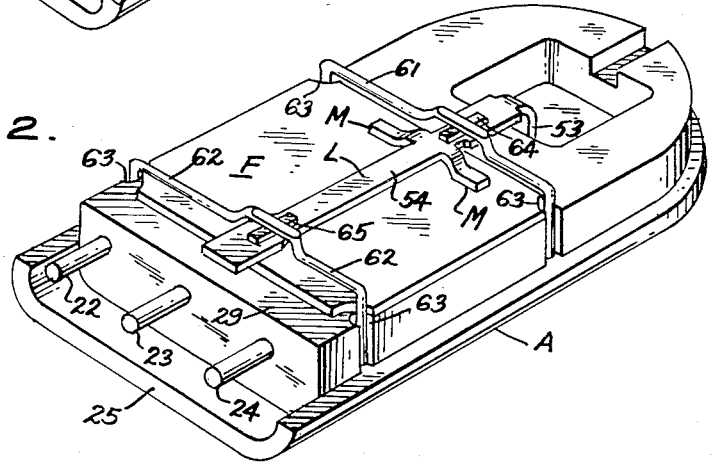
Fig. 2 is a view similar to Fig. 1 with the top covering removed, showing the armature and diaphragm in place on the body member.

The assembled cartridge (Fig. 1)

When fully assembled the cartridge 20 may appear as shown in Fig. 1, ready to be clamped into a tone arm (not shown). The body member A which contains or supports all the working parts is then covered by a cap 21 which protects the working parts and prevents tampering. Preferably the body member A and the cap 21 are permanently secured together as by cementing, but if desired they may be secured removably, as by a snap fit, to enable disassembly for inspection of the device. The only parts that project beyond the cartridge 20 are the needle N at the front and the three terminals 22, 23, 24 for the three electrodes G, H, and I. Of these, the outer terminals 22 and 24 are usually connected to oppositely polarized sources of direct current, and the center terminal 23 (which is the cartridge output terminal) connects to the voltage input for the amplifier or for the speaker (not shown).

Figure 3:
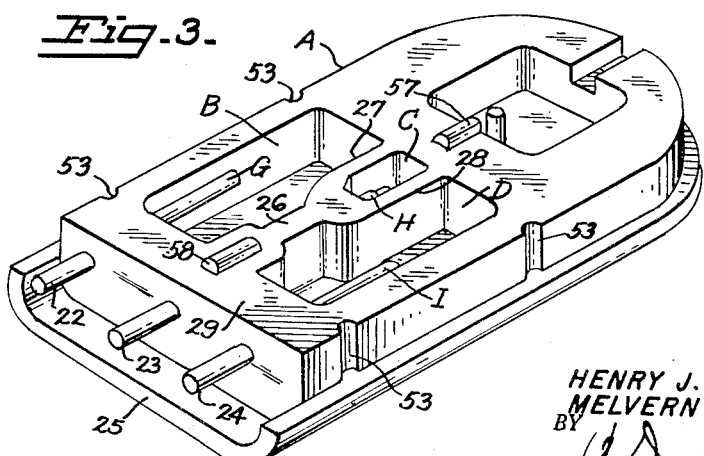
Fig. 3 is a view similar to Fig. 2 with the diaphragm and actuator removed, showing the body member with the cavities therein.

The body member A and the fluid cavities B, C, and D (Fig. 3)

Both the body member A and the cap or covering 21 are preferably made from a hard, rigid, strong plastic or from glass or from hard rubber or from some other suitable material which is an electrical insulator. The body member A may be molded, if desired, and is provided with suitable cavities, openings, and so on, which will be described as the occasion arises. One feature of the present invention is that the body member A may be very simple, due to the structure of the novel diaphragm F. So long as the body A has a reasonably flat upper surface so that the partitions may be glued to the flat lower edge of the diaphragm, it is unnecessary for it to have any particular intricacies other than the cavities B, C, and D. This contrasts strikingly with body members which have heretofore been required, because they were relatively complex in form and could be molded satisfactorily only in expensive dies and only from special types of plastics.

The exact shape of the three liquid-holding cavities or chambers B, C, and D is not critical, so long as the central chamber C borders the outer chambers B and D. The central chamber C may be substantially smaller than the other chambers, because the electrode H in the central chamber C carries no direct current.

The chambers B, C, and D are open only at their upper ends, their lower ends being closed by the lower wall 25 of the body A. A central partition 26 separates the chambers B and D from each other where they are adjacent, and the partitions 27 and 28 separate the central chamber C from the outer chambers B and D. The upper surfaces of these partitions 26, 27, 28 are preferably perfectly flat and preferably lie on substantially the same plane as the outer rim 29 around the chambers.

The electrodes

The electrodes G, H and I may be simply round copper wire molded into the body member A so that they are tightly sealed therein. The outer terminals 22, 23, 24 project outside the body member A, and the electrodes themselves are respectively in the three chambers B, C, and D. Other forms of electrodes may be used if desired, and so may other metals or types of material.

The liquid E

The finished cartridge incorporates a suitable electrolytic or other electrically conductive liquid E into the chambers B, C, and D. The liquid E may be applied before or preferably after the diaphragm F has been secured to the body A. In the latter instance it may be applied through a hypodermic needle or through a hole which is later sealed. The particular liquid forms no part of the present invention.

The diaphragm F

The diaphragm F contrasts rather strikingly with diaphragms heretofore used in pickups of this general type. Formerly, flat sheets of rubber latex or of other forms of rubber were used, and reliance was made upon the intricate formation of the body member A. In the present invention the body A is simpler than heretofore, and the diaphragm F is more complicated. However, the diaphragm material has been found to be easier to mold than the body material.

The material from which the diaphragm F is formed does not comprise any part of the present invention. Actually it is preferably a complex type of rubber or rubber-like material, its exact composition depending on the desired use. When used in the claims, the term "rubber" will be understood to include synthetic rubber-like polymers.

As the bottom plan view of Fig. 5 shows, the diaphragm F is preferably recessed to form a single inverted trough 30 which extends across parts of the cavities B, D and across the full width of the center cavity C. The trough 30 overlies the partitions 27 and 28 and cooperates with them to form the orifices J and K. Changes in pressure on the diaphragm F directly over the orifices J and K changes the size of the orifices J and K, and this is what actuates and controls the electric current passing through the pickup.

The shape of these gaps J and K is important, but a variety of shapes may be used to give different results depending on what is wanted. What will be wanted, depends upon the type of an amplifier system to be used or whether any amplifying system is to be used. It will also depend on whether or not the device is to be used as a phonograph pickup or as a transducer for some other purpose, as for a microphone. Some suitable shapes are shown in Figures 11 through 17. So far as the general principles of this invention are concerned, any shape at all may be used. Satisfactory performance has been obtained from rectangular orifices that were about 0.005" to 0.080" wide and 0.001" to 0.010" high. The diaphragm F itself may be about .8" long by .65" wide by 0.41" thick over most of its area and 0.010" thick at its thinnest portions.

The trough 30, shown in enlarged cross-section in Fig. 11 is a semicircle. The trough 31 shown in Fig. 12 is a rectangle, but has a generally similar action.

The trough 32 shown in Fig. 13 is serrated, with a central snubber 33. This snubber 33 engages the partition wall 27 and prevents the gap from being fully closed at any time, which is an advantage in some applications.

The trough 34 shown in Fig. 14 comprises a long row of shallow serrations. It may be used with a wide lever M to obtain a relatively large orifice. The serrations prevent full closure of the gap.

Fig. 15 shows a diamond-shaped trough 35 that is set above and away from the lower surface 36 of the diaphragm. The narrow passageway 37 remains open on the partial closing of the gap and limits the closure thereof.

Figs. 16 and 17 show rectangular troughs 38 and 39 set above the lower surface 36 and separated by a cut 40 in Fig. 16 and a tear 41 in Fig. 17.

The actuator or armature L and its relation to the diaphragm F

The armature L is preferably an integral, relatively rigid member. At its forward end it terminates in a chuck 50 that holds the needle N, the chuck 50 preferably being inclined forwardly as shown. Rearwardly from the chuck 50 a shank 51 is inclined back about 30° to the horizontal, the angle 52 between the portions 50 and 51 being about 139°. A generally vertical stem 53 joins the shank 51 to a longitudinally extending stem 54. The actuator blank may be stamped out from a piece of metal, and the actuator bent to shape in other dies. Broad V-bearings 55 and 56 may be provided to ride on rounded bearings 57 and 58 formed on the body A.

The actuating arms, levers, or presser feet M, and M' extend out at right angles to the actuator stem 54 and may be bent down somewhat lower, if desired.

The actuator L may be held in place on the bearings 57 and 58 by a pair of straps 61, 62, whose outer ends are secured in recesses 63 in the body A. Resilient, soft-rubber pads 64, 65 may be placed on top of the actuator L and under the straps 61, 62 to give more control of the compliance of the actuator L.

The valving action of the diaphragm F and armature L combination is illustrated somewhat by Figs. 6, 7, and 8. The actuator arms M and M' may normally permit the diaphragm to be fully relaxed, so that the gaps J and K are their normal size. Under pressure, the orifices J and K are narrowed, and upon release of pressure, the actuator arms M and M' will pull the diaphragm F up and the gaps J and K will become enlarged. If desired, the actuator L may hold the diaphragm F down under tension at all times. In either event, the feet M and M' are preferably cemented or otherwise bonded to the diaphragm F.

Operation

When the device is fully assembled the needle N may move from side to side in the record groove thereby swinging the armature L through a small arc. When it does this, the armature L causes one of its presser feet M to be forced down while the other presser foot M' is raised. The presser foot M then causes the gap J to become smaller, while the presser foot M' causes the gap K to become larger. When the needle N swings to the other side of the groove, the opposite effect occurs. In each case the amount of opening or closing of the gaps J or K is determined by the amplitude of the swing and the frequency of the opening or closing depends, of course, on the frequency recorded in the record groove. This change in shape of the gap causes a change in the voltage between the electrodes G and H and between the electrodes H and I and this change in voltage when transmitted from the terminals 22, 23, 24 to the proper amplifier or speaker emerges then, producing the original sound that was recorded upon the record.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A control device for electric circuits including in combination: a body of insulating material having a plurality of recessed chambers separated by partitions; an electrode in each of said chambers with a terminal connection outside said chamber; a flexible diaphragm secured to said body and covering said chambers, said diaphragm having a recessed portion in its inner surface providing passages joining adjacent chambers; an actuator having a member resting against said diaphragm over each said partition; means for varying the pressure by said actuator on said diaphragm to transmit externally originating motion thereto and to vary the area of each said passage; and an electrically conductive fluid filling said chambers and each said passage.

2. The device of claim 1 in which said recessed portion is wider in cross section than said actuator member.

3. The device of claim 1 in which said recessed portion is serrated in cross section, so that there are members therein preventing full closure of the passage.

4. The device of claim 1 in which said recessed portion is spaced away from said partitions by a split portion of said diaphragm.

5. A control device for electric circuits including in combination: a body of insulating material having a plurality of recessed chambers separated by partitions; an electrode in each of said chambers with a terminal connection outside said chamber; a flexible rubber diaphragm closing said chambers and having a recessed portion extending therein to provide an orifice between at least two adjacent chambers bounded by said diaphragm and said partitions; an actuator having a member pressing against and bonded to said diaphragm over each said orifice; means for varying the pressure by said actuator on said diaphragm to transmit externally originating motion thereto and to vary the area of each said orifice; and an electrically conductive fluid filling the space enclosed by said body and said diaphragm.

6. A control device for electric circuits, including in combination: a body of insulating material recessed from one face to provide three serially adjoining chambers separated by level partition walls; an electrically conductive fluid filling said chambers; an electrode in each of said chambers with terminal connections outside said chambers; a flexible diaphragm covering the recessed face of said body and closing said chambers and having a recessed inverted trough formed therein to provide two orifices, one between said center chamber and each of the other two chambers; an armature having portions secured to said diaphragm over said orifices; and means for swinging said armature in response to externally originating motion for widening one said orifice while narrowing the other said orifice.

References Cited in the file of this patent

UNITED STATES PATENTS

| 203,018 | Edison | Apr. 30, 1878 |

FOREIGN PATENTS

| 134,865 | Great Britain | Nov. 13, 1919 |
| 135,157 | Great Britain | Nov. 13, 1919 |